June 30, 1964 M. R. AARON 3,139,615
THREE-LEVEL BINARY CODE TRANSMISSION
Original Filed Nov. 23, 1959 2 Sheets-Sheet 1

INVENTOR
M. R. AARON
BY R. B. Ardis
ATTORNEY

INVENTOR
M. R. AARON
BY R. B. Anderson
ATTORNEY

United States Patent Office 3,139,615

Patented June 30, 1964

3,139,615

THREE-LEVEL BINARY CODE TRANSMISSION

Marvin R. Aaron, Whippany, N.J., assignor to Bell Telephone Laboratories, Incorporated, New York, N.Y., a corporation of New York Continuation of application Ser. No. 854,819, Nov. 23, 1959. This application July 25, 1962, Ser. No. 215,237
8 Claims. (Cl. 340—347)

This invention relates generally to the transmission of information by pulse techniques and more particularly, although in its broader aspects not exclusively, to transmission by pulse code techniques based upon a two-level or binary code.

This application is a continuation of the present inventor's prior application Serial No. 854,819, which was filed November 23, 1959, and has since been abandoned.

In the past, one difficulty with transmission of a conventional binary code train in a pulse code modulation or PCM system has been that such a pulse train possesses a direct-current component which creates restoration problems in systems employing transformers and coupling capacitors. Several schemes have been devised for converting the ordinary unipolar binary code train into a bipolar pseudo-ternary code train having no component at zero frequency. One of these is disclosed in United States Patent 2,759,047, which issued August 14, 1956, to L. A. Meacham. Another is disclosed in United States Patent 2,996,578, which issued August 15, 1961, to F. T. Andrews, Jr. In both, oppositely poled pulses appear alternately to provide a null in the power density spectrum of the pulse train at zero frequency. Problems of direct-current restoration are thus substantially eliminated.

An important advantage of both bipolar pulse conversion schemes is that the resulting power density spectrum also contains a null at the basic pulse repetition frequency, sometimes known as the bit rate. As pointed out in the Andrews patent, advantage may be taken of this null by superimposing a steady wave at that frequency upon the transmitted bipolar pulse train. Such a wave can be recovered with a minimum of filtering difficulty at each repeater point and used to reduce so-called jitter by accurately timing the regeneration of each transmitted pulse.

Under some circumstances, unfortunately, addition of a timing wave at a frequency as high as the bit rate can result in a troublesome degree of timing crosstalk between adjacent lines. Since adjacent PCM lines are seldom in perfect phase synchronism, serious errors can be introduced at repeater points if any substantial amount of energy at the timing frequency is received by crosstalk from other lines. Such crosstalk could be reduced markedly by reducing the timing frequency to some submultiple of the bit rate, but existing bipolar pulse transmission schemes provide no nulls in the power density spectrum at such frequencies.

A principal object of the present invention, therefore, is to reduce timing crosstalk between adjacent lines in a binary type pulse transmission system without introducing difficult filtering problems.

Another and more particular object of the invention is to permit a timing wave to be added to the transmitted wave in such a system at a submultiple of the bit rate without introducing difficult filtering problems.

A closely related object of the invention is to introduce a null into the power density spectrum of a binary code pulse train at a submultiple of the bit rate.

Still another object is to provide greater versatility than that afforded by the prior art in shaping the power density spectrum of a binary code pulse train.

The present invention permits both realization of these objects and retention of the advantages of the prior art represented by the disclosures of the above-identified Meacham and Andrews patents. In accordance with one feature of the present invention, a null is obtained in the power density spectrum of a binary code train at any desired submultiple of the bit rate by delaying the binary code train $n$ time slots or pulse periods, where $n$ is an integer greater than unity, and subtracting the delayed pulse train from the original binary code train. The resulting pulse train is a pseudo-ternary or three-level train having a null not only at zero freqency but also at a submultiple of the bit rate, depending upon the value of $n$.

In accordance with another feature of the invention, the original binary code train is recovered from the pseudo-ternary train by routing the components of consecutive time slots of the received pulse train into successively different ones of $n$ receiving channels in sequence, generating a unipolar pulse every $n^{th}$ time slot in each receiving channel in response to a received pulse of one polarity and continuing to do so until the receipt of a pulse of the opposite polarity, and combining the resulting unipolar pulses in their originally generated sequence.

Since the present invention retains the null at zero frequency afforded by Meacham and Andrews, problems of direct-current restoration are still avoided. The present invention provides a null at a submultiple of the bit rate, however, and a steady timing wave can be added at that frequency to reduce jitter without introducing unduly stringent filtering requirements. A substantial decrease in timing crosstalk between adjacent lines results.

A more complete understanding of the invention may be obtained from a study of the following detailed description of one specific embodiment. In the drawing.

Figure 1:
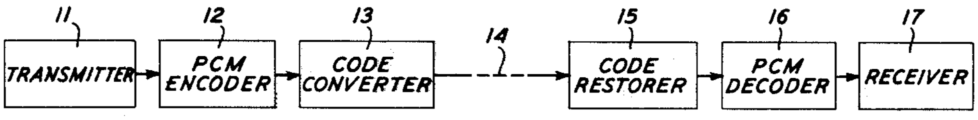
FIG. 1 is a block diagram showing the general outline of a PCM system embodying the invention.

A PCM system in which the present invention finds ready application is shown in block diagram form in FIG. 1. There, a transmitter 11 supplies signal amplitude samples containing the intelligence to be transmitted to a PCM encoder 12. Encoder 12 converts the signal amplitude samples to code groups of ON and OFF pulses in conventional two-level binary code form and supplies them to a code converter 13. An ON pulse in this context signifies the presence of a pulse and an OFF pulse signifies the absence of a pulse. Code converter 13, which takes the form of the circuit shown in FIG. 2 when $n$ is equal to two, alters the power density spectrum of the pulse train by producing a pseudo-ternary or three-level code train for transmission over transmission medium 14. This three-level pulse train is received by a code restorer 15 which, when $n$ is equal to two, takes the form of the circuit shown in FIG. 3. Code restorer 15 returns the pulse train to its original unipolar binary form and supplies it to a PCM decoder 16. Decoder 16 converts each code group to an equivalent signal amplitude sample which is, in turn, transmitted to a receiver 17 for utilization.

Figure 2:
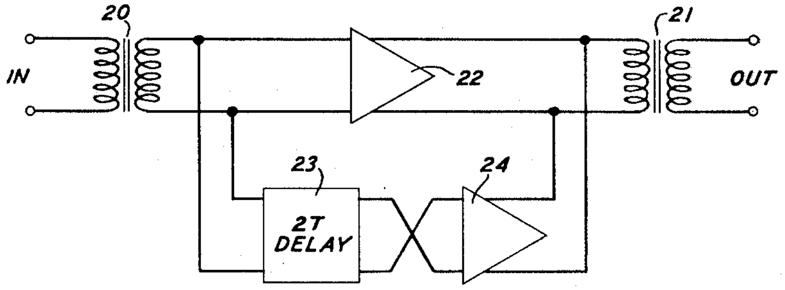
FIG. 2 illustrates a code converter for use in the system shown in FIG. 1, containing important features of the invention.

The code converter illustrated in FIG. 2 applies the principles of the invention for the case of $n$ equal to two. Conventional unipolar binary code groups of marks or ON pulses and spaces or OFF pulses are received from the system encoder by an input transformer 20. From there they are transmitted directly to an output transformer 21 through a buffer amplifier 22, which serves principally to block transmission in the reverse direction. Buffer amplifier 22 is, in accordance with a feature of the invention, shunted by a path which includes a delay line 23 and another buffer amplifier 24. Delay line 23 imposes a delay of two time slots or pulse periods T upon the pulse train received from input transformer 20, and buffer amplifier 24, like buffer amplifier 22, serves principally to block transmission in the reverse direction. As shown in FIG. 2, the connections from buffer amplifier 24 to output transformer 21 are reversed in order to provide subtraction of the delayed pulse train from the original binary code pulse train as passed by buffer amplifier 24.

Figure 4:
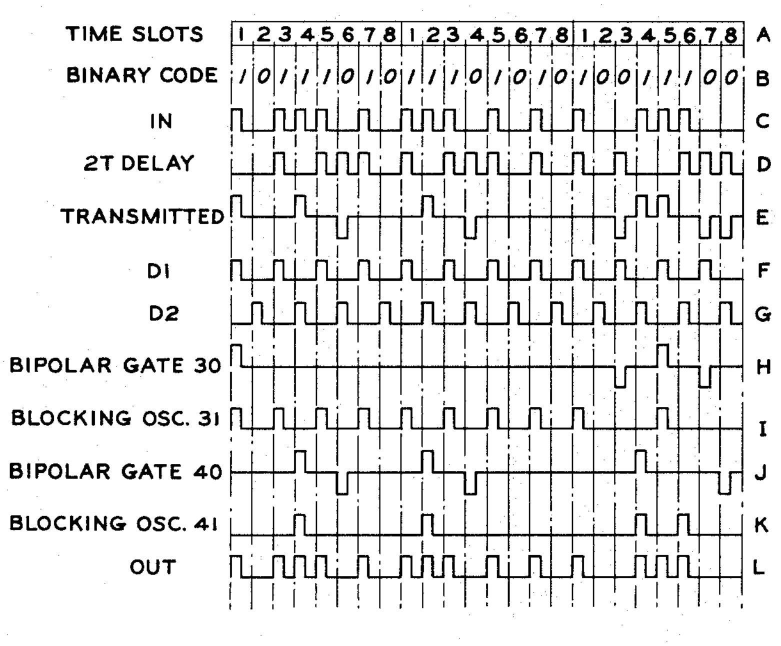
FIG. 4 shows a series of waveforms appearing at various points in the code converter and code restorer of FIGS. 2 and 3 for different input signals.

The operation of the code converter shown in FIG. 2 is illustrated by the waveforms shown in lines C through E of FIG. 4. In FIG. 4, line A indicates the successive time slots for three consecutive code groups and line B gives the conventional binary number representation of three eight-digit code groups used as examples. The waveform of the succession of corresponding unipolar code groups received by input transformer 20 and passed by buffer amplifier 22 is shown in line C. A fifty percent duty cycle is shown by way of example. The waveform delayed by two pulse periods and passed by buffer amplifier 24 is shown in line D. This second waveform is subtracted from the first in output transformer 21 and the resulting bipolar three-level waveform sent out over the transmission medium is shown in line E. As illustrated, the transmitted pulse train has no more than two successive ON pulses of the same polarity at the same time.

Figure 5:
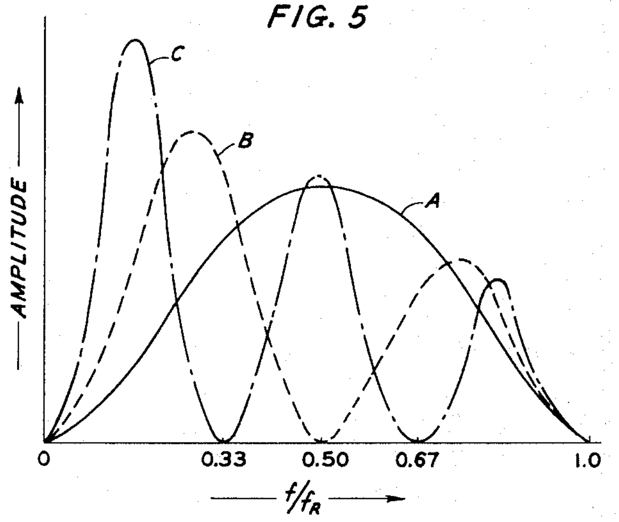
FIG. 5 illustrates the power density spectra provided by several embodiments of the present invention in comparison with one afforded by the prior art.

The power density spectrum of the three-level pulse train produced by the code converter shown in FIG. 2 for fifty percent duty cycle rectangular pulses is illustrated as curve B in FIG. 5. Curve A in that same figure shows the power density spectrum produced by the prior art three-level code conversion schemes disclosed by Meacham and Andrews. As shown, the latter has nulls at both zero frequency and at $f_R$, the bit rate. Such a spectrum avoids problems of direct-current restoration but is likely to encounter an undesirable amount of timing crosstalk if a timing wave having a frequency equal to the bit rate is added. The spectrum provided by the present invention, however, not only retains the null at zero frequency but also provides an additional null at a frequency equal to one-half the bit rate when $n$ is equal to two, as shown by curve B. A timing wave added at this frequency may be recovered easily at repeater points, will not be interfered with by components of the pulse train having the same or similar frequencies, and is much less subject to crosstalk. For timing purposes it can readily be transformed into the bit rate at repeater points by simple frequency doubling techniques.

Figure 3:
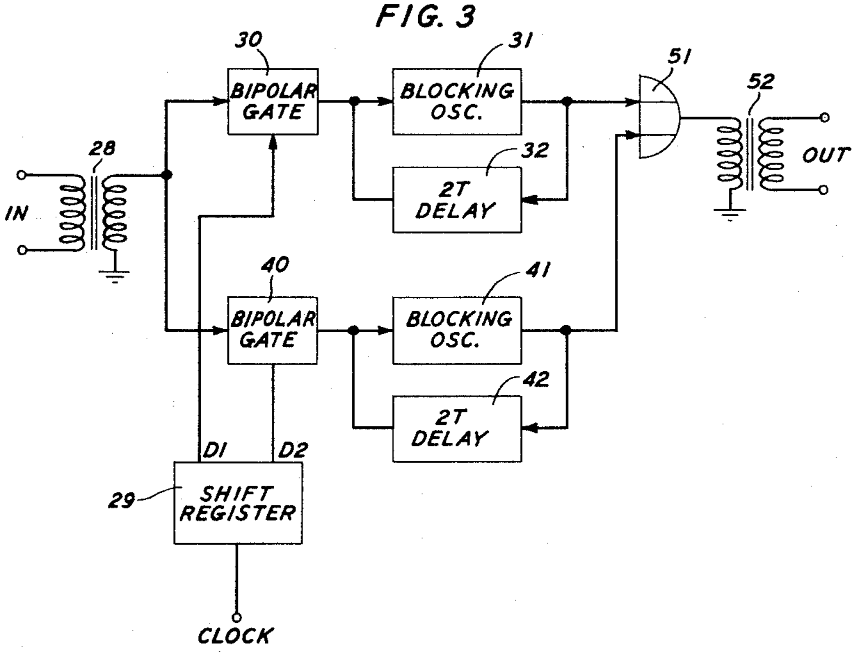
FIG. 3 illustrates a code restorer for use in the system of FIG. 1, containing other important features of the invention.

FIG. 3 illustrates a code restorer making use of the principles of the invention for the case of $n$ equal to two. There the bipolar three-valued pulse train formed by the code converter shown in FIG. 2 is received by an input transformer 28. In accordance with an important feature of the invention, the contents of successive time slots of the received pulse train are routed to a pair of receiving channels in alternation. Routing is accomplished by a two-stage shift register 29 in combination with a pair of bipolar transmission gates 30 and 40. Shift register 29 has two output terminals labeled D1 and D2, respectively, and is driven at the bit rate by a regular succession of clock pulses. It supplies a mark or ON pulse at the D1 terminal during every odd-numbered time slot and a similar mark or ON pulse at the D2 terminal during every even-numbered time slot. The ON pulses at the D1 terminal control the transmission through bipolar gate 30 while those at the D2 terminal control that through bipolar gate 40. As a result, the contents of each odd-numbered time slot of the received bipolar pulse train are passed by bipolar gate 30, while those of each even-numbered time slot are passed by bipolar gate 40.

Bipolar gates 30 and 40 in the code restorer illustrated in FIG. 3 each control a separate receiving channel which commences generating a unipolar ON pulse every second time slot upon the receipt of an ON pulse of one polarity and continues to do so until it receives an ON pulse of the opposite polarity. To accomplish this the first or odd receiving channel includes a blocking oscillator 31, which serves as a pulse regenerator, and a unilateral two-digit delay circuit 32 connected from the blocking oscillator output back to the blocking oscillator input. The second or even receiving channel includes a similarly connected blocking oscillator 41 and unilateral two-digit delay circuit 42. Each delay circuit may, if necessary, contain a buffer amplifier similar to amplifiers 22 and 24 in FIG. 2 to prevent transmission around the blocking oscillator in the direction from input to output. The outputs of blocking oscillators 31 and 41 are supplied to an OR gate 51 which has a pair of input leads and energizes its single output lead whenever either input lead is energized. The OR gate is represented in the drawing by a semicircle in which the input connections extend past the chord to the arc. The output from OR gate 51 is, in turn, supplied to an output transformer 52.

The manner in which the code restorer of FIG. 3 converts the three-level pulse train formed by the code converter of FIG. 2 back to the original unipolar binary code train is illustrated in lines F through L of FIG. 4. As indicated previously, the bipolar train transmitted by the code converter and received by the code restorer is illustrated in line E. The odd and even digit pulses generated by shift register 29 are shown in lines F and G, respectively. The positive and negative going ON pulses passed by bipolar gate 30 are shown in line H, while the unipolar ON pulses generated by blocking oscillator 31 are shown in line I. As illustrated, when blocking oscillator 31 receives a positive going ON pulse, it commences generating an ON pulse during every odd time slot and continues to do so until it receives a negative going ON pulse. The positive and negative going ON pulses passed by bipolar gate 40, on the other hand, are shown in line J, while the unipolar ON pulses generated by blocking oscillator 41 are shown in line K. As illustrated, blocking oscillator 41 commences generating an ON pulse during every even-numbered time slot upon receipt of a positive going ON pulse and ceases to do so only upon receipt of a negative going ON pulse. The ON pulses formed by blocking oscillators 31 and 41 are combined in their originally generated sequence by OR gate 51 to reform the original unipolar binary code train in output transformer 52, as shown in line L.

In general, the present invention contemplates the use of $n$ digits or time slots of delay in both the code converter and the code restorer, along with $n$ receiving channels in the code restorer to reform the original unipolar binary code pulse train, where $n$ is an integer greater than unity. The higher the value of $n$, the lower is the first null above direct current in the power density spectrum of the resulting three-level pulse train. Curve C of FIG. 5 shows the power density spectrum when $n$ is equal to three. Theoretically, at least, the lower the added timing wave can be in frequency, the less is the amount of timing crosstalk that takes place between adjacent lines. As a practical matter, however, the amount of additional crosstalk reduction made possible by a higher value of $n$ diminishes with each higher value. If the added timing wave is so reduced in frequency that it approaches direct current, moreover, it is likely to require inordinately large system coupling transformers in order to provide the necessary low frequency response. Limitation to relatively small values of $n$ is, therefore, generally desirable.

From one point of view, a principal advantage of the invention is the increased versatility it gives the system designer in permitting him to shape the power density spectrum of a pulse train as he sees fit. Nulls can be created at zero frequency to avoid problems of direct-current restoration and at any other desired frequency to permit the addition of a suitable timing wave. In addition, peaks in the power density spectrum can be shifted about with precision in order to avoid interference with other systems having similar power density spectra on adjacent lines.

It is to be understood that the above-described arrangements are illustrative of the application of the principles of the invention. Numerous other arrangements may be devised by those skilled in the art without departing from the spirit and scope of the invention. One example involves the use of a network following the code converter to change the shape of each pulse and alter further the shape of the power spectrum.

What is claimed is:

1. A system in which a two-valued binary code train of ON and OFF pulses each occupying one of a regularly spaced succession of time slots is transmitted in the form of a three-valued pulse train having an altered power density spectrum with nulls not only at zero frequency and the basic pulse repetition frequency of said binary code train but also at at least one intermediate frequency which comprises, at a transmitting station, means for delaying said binary code train $n$ time slots, where $n$ is an integer greater than unity, and means for subtracting the delayed pulse train from the original binary code train and, at a receiving station, $n$ receiving channels, means for routing the contents of successive time slots of the received pulse train into successively different receiving channels in sequence, means for generating an ON pulse every $n^{th}$ time slot in each of said receiving channels in response to a received ON pulse of one polarity until the receipt of an ON pulse of the opposite polarity, and means for combining generated ON pulses from all of said receiving channels in their original sequence to reform said original two-valued binary code train.

2. A system in accordance with claim 1 in which $n$ is equal to two, whereby a null is introduced in the power density spectrum of said transmitted three-valued pulse train at substantially half the basic pulse repetition frequency of said binary code train.

3. A system in which a two-valued binary code train of ON and OFF pulses each occupying one of a regularly spaced succession of time slots is transmitted in the form of a three-valued pulse train having an altered power density spectrum with nulls not only at zero frequency and the basic pulse repetition frequency of said binary code train but also at at least one intermediate frequency which comprises, at a transmitting station, means for delaying said binary code train $n$ time slots, where $n$ is an integer greater than unity, and means for subtracting the delayed pulse train from the original binary code train and, at a receiving station, $n$ receiving channels, means for routing the contents of successive time slots of the received pulse train into successively different receiving channels in sequence, a separate pulse regenerator in each of said receiving channels, means for delaying the output of each of said pulse regenerators $n$ time slots and reapplying it to the input of the same pulse regenerator, whereby each of said pulse regenerators generates an ON pulse every $n^{th}$ time slot in response to a received ON pulse of one polarity and continues to do so until the receipt of an ON pulse of the opposite polarity, and means for combining generated ON pulses from all of said receiving channels in their original sequence to reform said original two-valued binary code train.

4. A system in accordance with claim 3 in which $n$ is equal to two, whereby a null is introduced in the power density spectrum of said transmitted three-valued pulse train at substantially half the basic pulse repetition frequency of said binary code train.

5. Apparatus for converting a two-valued pulse train having a basic pulse repetition frequency and a power density spectrum with components at zero frequency and said basic pulse repetition frequency and at substantially all intermediate frequencies into a three-valued pulse train having a different power density spectrum with nulls not only at zero frequency and said basic pulse repetition frequency but also at at least one intermediate frequency which comprises means for delaying said two-valued pulse train $n$ pulse periods, where $n$ is an integer greater than unity, and means for subtracting the delayed pulse train from the original two-valued pulse train.

6. Apparatus in accordance with claim 5 in which $n$ is equal to two, whereby a null is introduced in the power density spectrum of said three-valued pulse train at substantially half the basic pulse repetition frequency of said two-valued train.

7. In a system for transmitting a three-valued train of ON and OFF pulses each occupying one of a regularly spaced succession of time slots and in which at least some of the ON pulses are of opposite polarity to one another with respect to said OFF pulses, a receiver for said train which comprises $n$ receiving channels, where $n$ is an integer greater than unity, means for routing the contents of successive time slots of the received pulse train into successively different receiving channels in sequence, a separate pulse regenerator in each of said receiving channels, means for delaying the output of each of said pulse regenerators $n$ time slots and reapplying it to the input of the same pulse regenerator, whereby each of said pulse regenerators generates an ON pulse every $n^{th}$ time slot in response to a received ON pulse of one polarity and continues to do so until the receipt of an ON pulse of the opposite polarity, and means for combining generated ON pulses from all of said receiving channels in their original sequence.

8. A receiver in accordance with claim 7 in which $n$ is equal to two.

References Cited in the file of this patent

UNITED STATES PATENTS 2,700,696 Barker ---------------- Jan. 25, 1955